United States Patent [19]

Verloop et al.

[11] 4,210,627
[45] Jul. 1, 1980

[54] METHOD FOR INCREASING THE HYDROGEN SULPHIDE CONCENTRATION IN AN ACID GAS

[75] Inventors: Jan Verloop; Johannes W. T. M. Braam, both of The Hague, Netherlands

[73] Assignee: Shell Oil Company, Houston, Tex.

[21] Appl. No.: 873,821

[22] Filed: Jan. 31, 1978

[30] Foreign Application Priority Data

Feb. 4, 1977 [NL] Netherlands .................... 7701175

[51] Int. Cl.² ........................................... B01D 53/34
[52] U.S. Cl. ........................................ 423/220; 55/18; 55/73; 261/46; 261/63; 422/111
[58] Field of Search ............... 423/220, 226, 228, 229, 423/232, 233, 574 L; 261/21-23 R, 45, 46, 54, 55, 63, 146-148; 55/30, 31, 18, 63, 68, 73, 180, 226, 225; 422/108-111

[56] References Cited

U.S. PATENT DOCUMENTS

| 2,614,904 | 10/1952 | Royer ................................ 423/226 |
| 3,333,398 | 8/1967 | Schneider ............................. 55/18 |
| 3,338,664 | 8/1967 | Bally et al. ......................... 423/223 |
| 3,640,052 | 2/1972 | Konoki et al. ................. 423/220 X |
| 4,001,386 | 1/1977 | Klein et al. ..................... 423/574 L |

Primary Examiner—Earl C. Thomas

[57] ABSTRACT

A method for increasing the hydrogen sulfide concentration in a gas stream, particularly a stream to be fed to a Claus unit, is disclosed. The method is characterized by the measurement of the flow of the gas stream to an absorption system, and in response to such measurement, separation of a portion of the acid gas leaving the regenerator of the system, and selective absorption of the $H_2S$ in the portion, with passage of the loaded absorbent to the regenerator.

14 Claims, 2 Drawing Figures

METHOD FOR INCREASING THE HYDROGEN SULPHIDE CONCENTRATION IN AN ACID GAS

BACKGROUND OF THE INVENTION

In many cases it is necessary to remove $H_2S$ from gas mixtures, e.g., in order to render these gas mixtures suitable for catalytic conversions using sulphur-sensitive catalysts, or in order to reduce environmental pollution, if before or after combustion the gas mixtures are to be discharged to the atmosphere. Examples of gas mixtures from which $H_2S$ generally has to be removed are gases obtained by complete or partial combustion or gasification of oil and coal, refinery gases, town gas, natural gas, coke-oven gas, water gas, propane and propylene.

In many cases the $H_2S$ will be removed from the gas mixtures using liquid absorbents. In a large number of cases the gas mixtures to be purified will also contain $CO_2$, at least some of which will be absorbed in the liquid absorbent with the $H_2S$. The $H_2S$ and $CO_2$ will be removed from the said gas mixtures at the pressure of the gas mixture concerned, i.e., in many cases at elevated pressure. By heating the loaded liquid absorbent (liquid absorbent is hereinafter also referred to as absorbent), for example, with steam, an acid gas stream is obtained containing substantially $H_2S$ and $CO_2$ in the ratio in which these substances were present in the loaded absorbent.

This $H_2S$ and $CO_2$-containing acid gas cannot be discharged to the atmosphere before at least most of the $H_2S$ has been removed. The $H_2S$ is suitably removed from this gas by converting the $H_2S$ into elemental sulphur.

The gas mixture is preferably supplied to a unit in which the hydrogen sulphide is converted into elemental sulphur, such as the Claus process. In this unit, a proportion of the $H_2S$ is oxidized to $SO_2$, which in reaction with the remaining $H_2S$, possible under the effect of a suitable catalyst, forms sulphur and water. This conversion of $H_2S$ into elemental sulphur proceeds more readily when the $H_2S$ concentration in the acid gas is above a certain minimum value. Thus, special measures become necessary if the $H_2S$ concentration is lower than 15%. An $H_2S$ concentration of less than 2% renders the use of the Claus process, even with special measures, such as direct oxidation or fuel gas injection, no longer attractive.

The object of the invention is to provide a method for automatically increasing the concentration of hydrogen sulphide in an acid gas which method is reliable, simple to perform, relatively less expensive and moreover flexible.

To that end, the method according to the invention is characterized in that a value is determined for the magnitude of the gas stream passing to the absorber; in that, if this value is smaller than a predetermined value, a proportion of the liberated or acid gas is passed to a second selective absorber, in which it is contacted with a proportion of the regenerated absorbent originating from the regenerator, which absorbent, when loaded, is then supplied to the regenerator, and that if the said value again rises above a second predetermined value, the second absorber is shut down.

The magnitude of the gas stream determines, among other things, the degree in which the absorbent also absorbs carbon dioxide, in such a way that if there is a small gas stream, much more $CO_2$ is absorbed than if this stream has a high value. The gas liberated from the absorbent after regeneration contains not only hydrogen sulphide but also carbon dioxide. Now if, for example, the hydrogen sulphide represents only 2% of the total quantity of gas, then it is not desired to pass this gas stream to the Claus process.

According to the invention a proportion of the liberated gas stream is passed to a second absorber, in which the conditions are so selected that preferably $H_2S$ is absorbed in the absorbent, or, in other words, that $H_2S$ is selectively removed from the gas stream. The resultant loaded absorbent is also passed from the second absorber to the regenerator, where the gas is liberated from the absorbent, as is the gas originating from the loaded absorbent of the first absorber. It will now be clear that the combined gas stream originating from the regenerator has a higher hydrogen sulphide content than the gas leaving the regenerator before the second absorber was actuated. A new equilibrium adjusts itself at a desired $H_2S$ concentration. If, subsequently, the gas stream to the first absorber begins to increase again, at a certain moment the situation will be reached that the measured value exceeds a second predetermined value whereupon the gas stream to the second absorber is stopped. Preferably this second predetermined value is selected larger than the first predetermined value in order to be sure that this automatically proceeding process continues to be controlled in a stable manner.

At the moment that it is established that the magnitude of the incoming gas stream has become too small, the $H_2S$ concentration of the discharged gas is still sufficient, to the extent of course that the quantity of $H_2S$ in the supplied gas remains reasonably constant; the effect of the reduced supply will only become felt at the outlet of the plant after some time. Hence the control of the gas stream to the second absorber must only be initiated some time after the reduced supply has been observed. In order to have the second absorber in operation at the moment when the gas begins to flow to this absorber, the absorbent circulation is generally started immediately the magnitude of the quantity of the gas flowing to the first absorber has fallen below a certain desired value; a corresponding signal is subsequently passed via a delay device to open the line through which the gas is passed to the second absorber.

If the hydrogen sulphide concentration in the supply to the first absorber is not substantially constant, it is preferred when comparing the value of the quantity with the predetermined value also to take into consideration the concentration of hydrogen sulphide in the liberated gas. In this way it is possible to keep the quality, i.e. the $H_2S$ concentration of the liberated gas, within certain limits.

The invention will now be further elucidated with reference to the drawing, in which.

Figure 1:
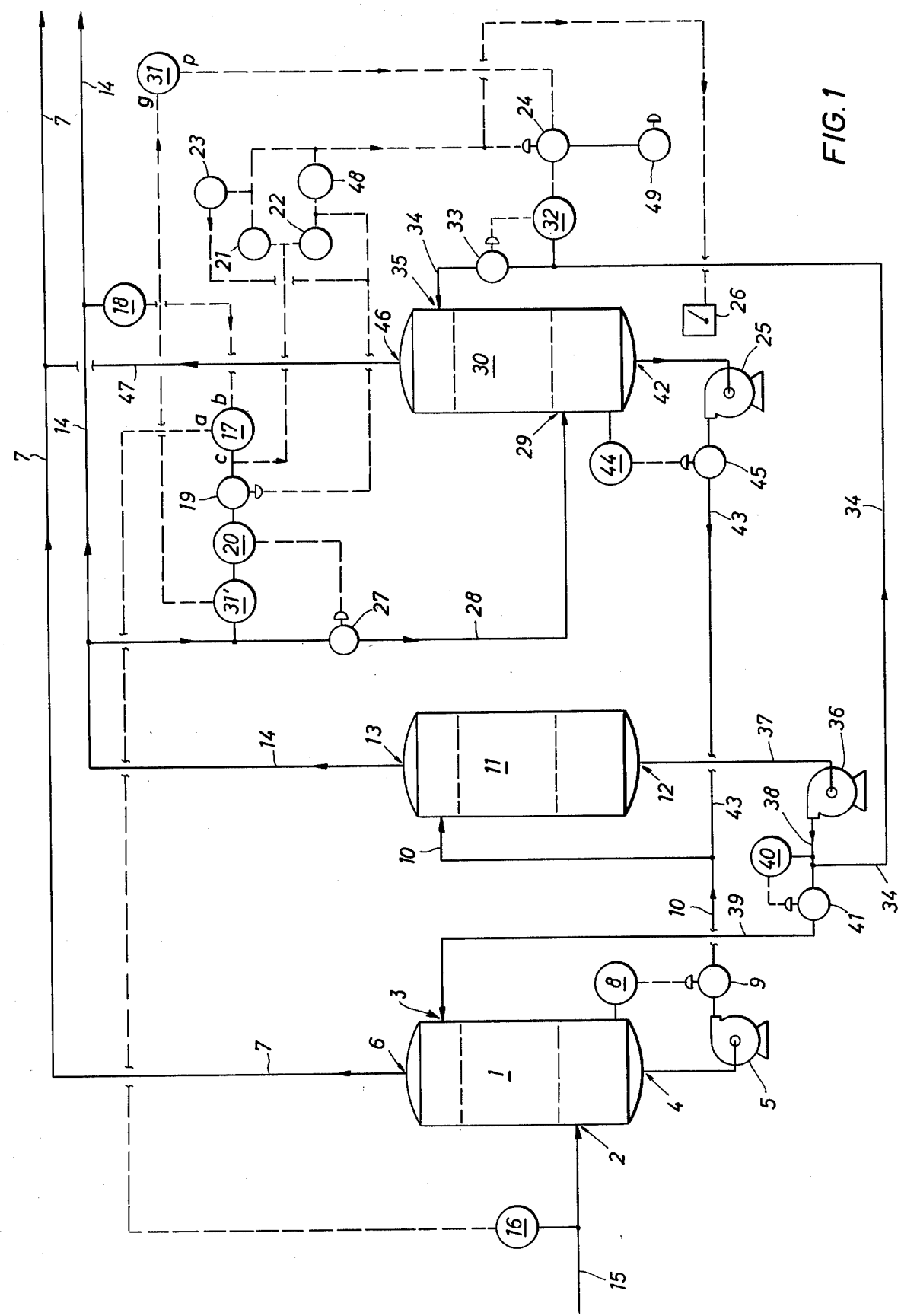
FIG. 1 shows diagrammatically the plant in which the method according to the present invention can be carried out.

In FIG. 1, reference numeral 1 designates an absorber in which at 2 an acid gas is supplied and at 3 an absorbent, which absorbent, loaded with acid constituents from the gas leaves the absorber at the bottom at 4, assisted by a pump 5. At the top of the absorber at 6 the remaining gas is discharged, through a line 7, to, for example, a combustion furnace (not shown). The liquid level in the absorption column 1 is controlled by means of a level controller 8, and a control valve 9, incorporated in the delivery line 10 of the pump 5. The loaded absorbent is supplied through the line 10 into the top of a regenerator 11, in which the acid gas constituents are again separated from the absorbent in such a way that clean absorbent leaves the regenerator through the bottom at 12, and the acid gas constituents, largely comprising hydrogen sulphide and carbon dioxide, leave the regenerator at the top at 13. This acid gas mixture is passed through the line 14 to for example a Claus process (not shown) in which the hydrogen sulphide is converted into elemental sulphur. The supply line 15 for the acid gas to the absorber 1 is provided with a flow meter and transmitter 16, which determines the magnitude of the gas stream and generates a corresponding signal a which is then passed to a computing device 17. To this computing device is also supplied a signal b originating from a meter and transmitter 18 which is incorporated in the line 14 and determines the hydrogen sulphide concentration in the gas flowing through the line. The output signal c from the computing device 17 depends on the signals a and b as follows:

$$c = -fa + kb$$

in which f and k represent constants.

This signal c is passed to a solenoid valve 19, which allows the signal to pass to a flow controller 20 as soon as the said valve is opened under the effect of a signal which is generated at the output of the switch 21 if c is larger than a first predetermined value. If c subsequently falls below a second predetermined value, the switch 22 will produce a signal with which the valve is closed. The signal at the output of switch 21 passes a delay device 23 on its way to the valve 19, as a result of which some time passes between the arrival of the signal at the input of the said element 23 and the arrival of the signal at its output and consequently at the valve 19. The output of the switch 21 is further connected with a solenoid valve 24, which is opened by the signal originating from switch 21, while the said signal also serves to start the pump 25 through the switch 26. As soon as the valve 19 opens, the signal c is allowed through to the flow controller 20, which operates a valve 27 in a branch 28 of the gas line 14 in such a way that it opens with the result that the gas is allowed to flow at 29 into a second absorber 30. The flow meter and transmitter 31' in the gas line 28 measures the magnitude of the gas stream concerned and passes a corresponding signal g to a computing device 31 in which by means of a predetermined set value h the equation:

$$p = qg + h$$

is generated, in which q represents a constant value. The signal p is passed through the already open valve 24 to a flow controller 32, which operates a valve 33 in the line 34, which debouches at 35 in the top of the absorber 30.

The clean absorbent leaving the regenerator 11 at 12 is drawn in pump 36 through the line 37 and delivered into the line 38 which branches into the above-mentioned line 34 and a line 39, which latter debouches in the first absorber 1 at 3. A flow controller 40 with a corresponding control valve 41 ensures that the total stream of absorbent remains constant. The quantity of absorbent flowing to the second absorber 30 is controlled by the controller 32 with the corresponding control valve 33.

The loaded absorbent leaves the absorber 30 through the bottom at 42 and is pumped by pump 25 through the delivery line 43 into the line 10, through which the loaded absorbent is passed to the regenerator 11. The liquid level in the absorber 30 is held at a certain minimum value by means of a level controller 44 and a corresponding control valve 45.

The system described above works as follows: if the magnitude of the gas stream passing to the first absorber 1 decreases, the signal a will decrease and consequently the signal c will increase until it exceeds a certain predetermined value, after which the valve 24 is opened by means of the switch 21. The signal p is now passed to the controller 32 as a result of which valve 33 opens and the inflow of solvent into the absorber 30 at 35 is made possible. After some time, as a result of the delay element 23, the valve 19 opens. A proportion of the gas stream which is transported through the line 14 to a subsequent process, such as a Claus process, will now be passed through the line 28 to the absorber 30. The latter absorber will be so chosen that substantially all the hydrogen sulphide is absorbed from the gas in the absorbent, while most of the carbon dioxide is discharged at 46 through the line 47 to the discharge line 7, which leads for example to a combustion furnace (not shown). The loaded absorbent is passed to the regenerator 11, where the gas is separated from the solvent, with the result that the concentration of hydrogen sulphide in the gas stream leaving the regenerator at 13 has increased, in which way a new equilibrium adjusts itself at which the $H_2S$ concentration is at a higher value than if no gas were passed to the second absorber 30. It is ensured by means of the controller 18 that the quality of the gas in the line 14, i.e. the $H_2S$ content of this gas, remains constant, at least within certain limits.

Instead of a relatively expensive quality controller, it is possible to use a flow controller at this location if the quality of the feed gas upstream of the plant, i.e. the quality of the gas introduced through line 15 into the first absorber 1 at 2, is constant or substantially constant.

If the feed stream increases again the signal c becomes smaller. As soon as a certain minimum value is exceeded the switch 22 is actuated. The output of this switch 22 is directly connected with the valve 19, which is now closed with the result that the valve 27 also closes and the gas stream through the line 28 is therefore stopped. This output is further connected via a delay device 48 with the valve 24 which, some time after the gas stream stops, is thus closed at the same time as the pump 25. The valve 24 is fitted with a needle valve 49 which ensures that the set signal p can decay only slowly so that the valve 33 in the solvent line 34 also closes slowly.

Figure 2:
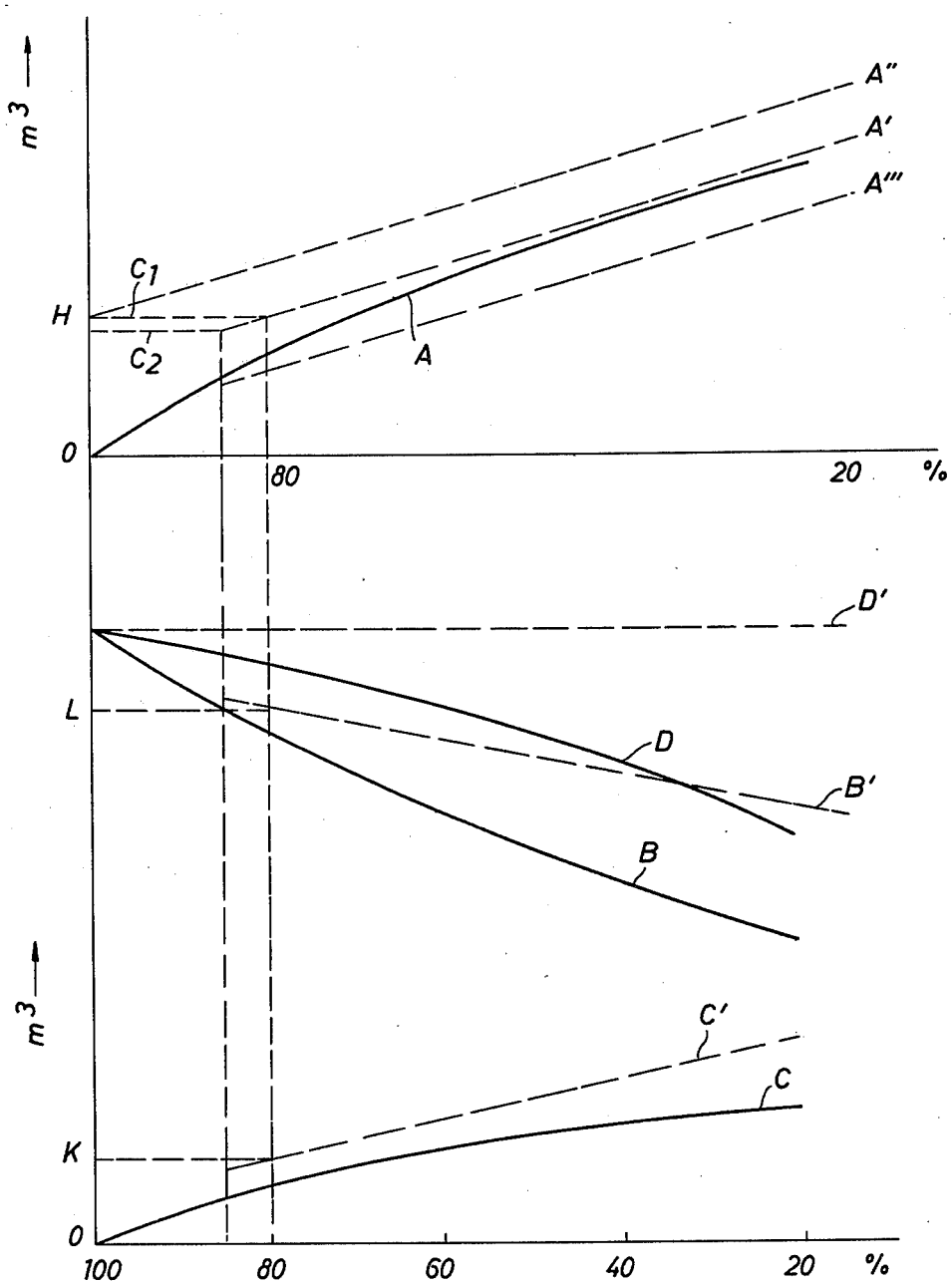
FIG. 2 shows the magnitude of the various process streams as a function of the magnitude of the gas stream to the plant in FIG. 1.

FIG. 2 represents diagrammatically the magnitude in $m^3$ of the various streams of the plant from FIG. 1, as a function of the percentage of the design capacity of the quantity of gas to be treated, i.e. the gas supplied through the line 15 into this plant. Curve A relates to the magnitude of the gas stream theoretically to be recycled, i.e. the stream in line 28; curve B relates to the magnitude of the theoretically required absorbent stream which would be introduced into the absorber 1 at 3; curve C relates to the magnitude of the theoretically required absorbent stream which would be introduced into the absorber 30 at 35, and curve D relates to the algebraic sum of these two absorbent streams, in other words the stream in line 38. As has been mentioned above, these curves represent the theoretically required quantities. These theoretically calculated quantities are approximated by means of the control system described with reference to FIG. 1; the magnitude of the actual streams will therefore depend linearly on the stated percentage of the design capacity of the plant. Lines A', A'', A''', B', C' D' therefore each represent the actual relationship which may exist between the said quantities. In the figure the situation is represented in which the valve 27 in the line 28 is opened as soon as the quantity of gas flowing into the plant through the line 15 falls to only 80% of the design capacity. The valve 27 then opens so far that the quantity H of gas is passed to the absorber 30, in which the quantity K of absorbent is already circulating. It is assumed in this respect that the quality, i.e. the $H_2S$ content, of the gas in line 14 is at a desired level, since the quality of the gas in the line 14 is a measure of b and therefore of c according to the equation: $c = -fa + kb$. FIG. 2 shows this relationship for three values of b, a desired value: line A'; a lowest admissible value: line A''; and a maximum admissible value of B: line A'''. The figure further shows that the valve 27 is closed, such that the gas stream to the second absorber stops, as soon as the gas supply to the line 15 has reached such a value that the signal c becomes smaller than the value $c_2$ as a result of which (see FIG. 1) the solenoid valve 19 is closed and after some delay the solenoid valve 24, as a result of which the absorbent circulation in the second absorber will also gradually stop.

The theoretically required quantity of absorbent can be determined by means of the curves B and C for the first and second absorber respectively, the total required quantity is the algebraic sum of the above-mentioned quantities and can be determined by means of curve D. Preferably, in practice the total quantity of absorbent in the plant is held continuously constant in such a manner that the substantially horizontal line D' represents this constant quantity of solvent. Now if a quantity of solvent K begins to circulate in the second absorber, this will be at the expense of the quantity which initially circulated in the first absorber, so that this quantity falls to a value L, which is nevertheless amply sufficient.

It will be quite clear that the invention is not limited to the embodiment described above, which is given only by way of example. In particular it is perfectly possible, without departing from the conception of the invention, to allow the control of the quantity of gas passed to the second absorber to depend on the magnitude of the gas stream to the first absorber: signal a, and on the quality of the discharged gas: signal b, according to the equation:

$$c = -(m \cdot a / n \cdot b)$$

in which m and n represent constants.

As has been remarked above, the meter 18 for the quality of the discharged gas need not necessarily be a quality meter capable of measuring the $H_2S$ concentration in the gas, but, provided that the quality of the gas supplied to the first absorber is substantially constant, it may also be a flow meter. This meter, however, is not at all necessary for achieving the primary object of the invention, since the measurement of the quantity of supplied gas, certainly if its quality is substantially constant, provides already sufficient information with respect to the probable quality of the gas to be discharged.

We claim:

1. A process for the removal of $H_2S$ and $CO_2$ from a gas stream comprising:
   (a) measuring the flow of the gas stream to produce a value representing the magnitude of the gas stream,
   (b) contacting said gas stream with a liquid regenerable absorbent in an absorber to absorb $H_2S$ and $CO_2$ from the gas stream and producing a loaded absorbent solution,
   (c) regenerating the loaded absorbent solution in a regenerator to produce an acid gas stream containing $H_2S$ and $CO_2$, and an absorbent solution,
   (d) comparing the value representing the magnitude of gas stream entering the absorber of step (a) with a predetermined value, and, if this value is smaller than a predetermined value, passing a portion of the acid gas stream to a second selective absorber, the second absorber being maintained under conditions to absorb $H_2S$ and reject $CO_2$ and the absorbent solution being a portion of that regenerated from the regenerator,
   (e) returning loaded absorbent solution from the second selective absorber to the regenerator, and
   (f) regenerating the loaded absorbent solutions from steps (c) and (e) to produce an acid gas having an increased $H_2S$ concentration.

2. The method of claim 1 wherein the flow of the gas stream is again measured to produce a value representing the magnitude of the gas stream, and if this value exceeds a second predetermined value, the passing of a portion of the acid gas stream to the second selective absorber is discontinued.

3. The method of claim 1 in which, when actuating the second absorber, the absorbent circulation is started first and the acid gas stream is passed to the second absorber.

4. The method of claim 1 in which the quantity of the acid gas stream passing to the second absorber is measured and the magnitude of the absorbent circulation in the second absorber is controlled in dependence on this quantity.

5. The method of claim 3 in which a value c is calculated from the formula $c = -fa + kb$, wherein a is the value of the magnitude of the gas stream passing to the absorber, b is the value of the hydrogen sulphide concentration in the acid gas stream or the magnitude of the acid gas stream, f and k represent constants, and the value c is compared with the predetermined value.

6. The method of claim 3 in which a value c is calculated from the formula $c = -(m \cdot a)/(n \cdot b)$ wherein a is the magnitude of the gas stream passing to the absorber, b is the value of the hydrogen sulfide concentration in the acid gas stream or the magnitude of the acid gas stream, m and n represent constants, and the value of c is the value compared with the predetermined value.

7. A process for the removal of $H_2S$ and $CO_2$ from a gas stream comprising:
   (a) measuring the flow of the gas stream to produce a value a representing the magnitude of the gas stream,
   (b) contacting said gas stream with a liquid regenerable absorbent in an absorber to absorb $H_2S$ and $CO_2$ from the gas stream and producing a loaded absorbent solution, (c) regenerating the loaded absorbent solution in a regenerator to produce an acid gas stream containing $H_2S$ and $CO_2$, and an absorbent solution, (d) measuring the flow of the acid gas stream to produce a value b representing the magnitude of the acid gas stream or the $H_2S$ concentration in the acid gas stream, (e) computing a value c from the formula $c = -fa + kb$ wherein a and b are as above, and f and k represent constants, (f) comparing the value c with a predetermined value, and, if this value is smaller than a predetermined value, passing a portion of the acid gas stream to a second selective absorber, the second absorber being maintained under conditions to absorb $H_2S$ and reject $CO_2$ and the absorbent solution being a portion of that regenerated from the regenerator, (g) returning loaded absorbent solution from the second selective absorber to the regenerator, and (h) regenerating the loaded absorbent solutions from steps (c) and (g) to produce an acid gas having an increased $H_2S$ concentration.

8. The method of claim 7 in which, when actuating the second absorber, the absorbent circulation is started first and the acid gas stream is passed to the second absorber.

9. The method of claim 7 in which the quantity of the acid gas stream passing to the second absorber is measured and the magnitude of the absorbent circulation in the second absorber is controlled in dependence on this quantity.

10. The method of claim 7 wherein the flow of the gas stream and the flow of the acid gas stream are again measured to produce the values a and b, respectively, and the value c is computed according to the formula $c = -fa + kb$, and if the value c exceeds a second predetermined value, the passing of a portion of the acid gas stream to the second selective absorber is discontinued.

11. A process for the removal of $H_2S$ and $CO_2$ from a gas stream comprising:

(a) measuring the flow of the gas stream to produce a value a representing the magnitude of the gas stream, (b) contacting said gas stream with a liquid regenerable absorbent in an absorber to absorb $H_2S$ and $CO_2$ from the gas stream and producing a loaded absorbent solution, (c) regenerating the loaded absorbent solution in a regenerator to produce an acid gas stream containing $H_2S$ and $CO_2$, and an absorbent solution, (d) measuring the flow of the acid gas stream to produce a value b representing the magnitude of the acid gas stream or the $H_2S$ concentration in the acid gas stream, (e) computing a value c from the formula $c = -(m \cdot a / n \cdot b)$ wherein a and b are as above, and m and n represent constants, (f) comparing the value c with a predetermined value, and, if this value is smaller than a predetermined value, passing a portion of the acid gas stream to a second selective absorber, the second absorber being maintained under conditions to absorb $H_2S$ and reject $CO_2$ and the absorbent solution being a portion of that regenerated from the regenerator, (g) returning loaded absorbent solution from the second selective absorber to the regenerator, and (h) regenerating the loaded absorbent solutions from steps (c) and (g) to produce an acid gas having an increased $H_2S$ concentration.

12. The method of claim 11 in which, when actuating the second absorber, the absorbent circulation is started first and the acid gas stream is passed to the second absorber.

13. The method of claim 11 in which the quantity of the acid gas stream passing to the second absorber is measured and the magnitude of the absorbent circulation in the second absorber is controlled in dependence on this quantity.

14. The method of claim 11 wherein the flow of the gas stream and the flow of the acid gas stream are again measured to produce the values a and b, respectively, and the value c is computed according to the formula $c = -(m \cdot a / n \cdot b)$ and if the value c exceeds a second predetermined value, the passing of a portion of the acid gas stream to the second selective absorber is discontinued.

* * * * *